(12) United States Patent
Fujihashi

(10) Patent No.: US 6,934,517 B2
(45) Date of Patent: Aug. 23, 2005

(54) CELLULAR PHONE HOLDER

(75) Inventor: Kouichiro Fujihashi, Yokohama (JP)

(73) Assignee: Kabushiki Kaisha Kanagawa Houseishoukai, Yokohama (JP)

( * ) Notice: Subject to any disclaimer, the term of this patent is extended or adjusted under 35 U.S.C. 154(b) by 777 days.

(21) Appl. No.: 09/795,358

(22) Filed: Mar. 1, 2001

(65) Prior Publication Data

US 2001/0029170 A1 Oct. 11, 2001

(30) Foreign Application Priority Data

Mar. 3, 2000 (JP) .......................................... 2000-058118

(51) Int. Cl.[7] ................................................ H04B 1/38
(52) U.S. Cl. ...................... 455/90.1; 455/95; 455/569.1; 455/575.1; 455/575.6; 455/90.3; 379/446; 379/455; 379/449; 379/433.13
(58) Field of Search ....................... 455/90.1, 95, 569.1, 455/568.1, 568.8, 90.3; 379/446, 430, 440, 449, 433.13

(56) References Cited

U.S. PATENT DOCUMENTS 5,947,359 A * 9/1999 Yoshie ........................ 224/570
6,043,626 A * 3/2000 Snyder et al. .............. 320/113
6,206,257 B1 * 3/2001 Peele et al. ................. 224/197
6,246,766 B1 * 6/2001 Walsh ......................... 379/455
6,535,605 B1 * 3/2003 Ghassabian .............. 379/433.1

* cited by examiner

Primary Examiner—Marceau Milord
(74) Attorney, Agent, or Firm—Townsend & Banta

(57) ABSTRACT

The object of this invention is to provide a cellular phone holder, which could easily hold a standard type cellular phone as well as a collapsible type cellular phone having different sizes, respectively. Thus cellular phone holder is comprised of a lateral case capable of holding cellular phones of different width, and a longitudinal strap belt attached in a manner so as to intersect with the lateral case. Thus lateral case is formed of a single trunk member in which the trunk member is bent into a cylindrical shape and secured by Velcro tape attached in plural portions. A ring couples thus longitudinal strap belt to a plurality of strap belts and thus, a portion of the longitudinal strap belt is structured by an elastic material.

11 Claims, 5 Drawing Sheets

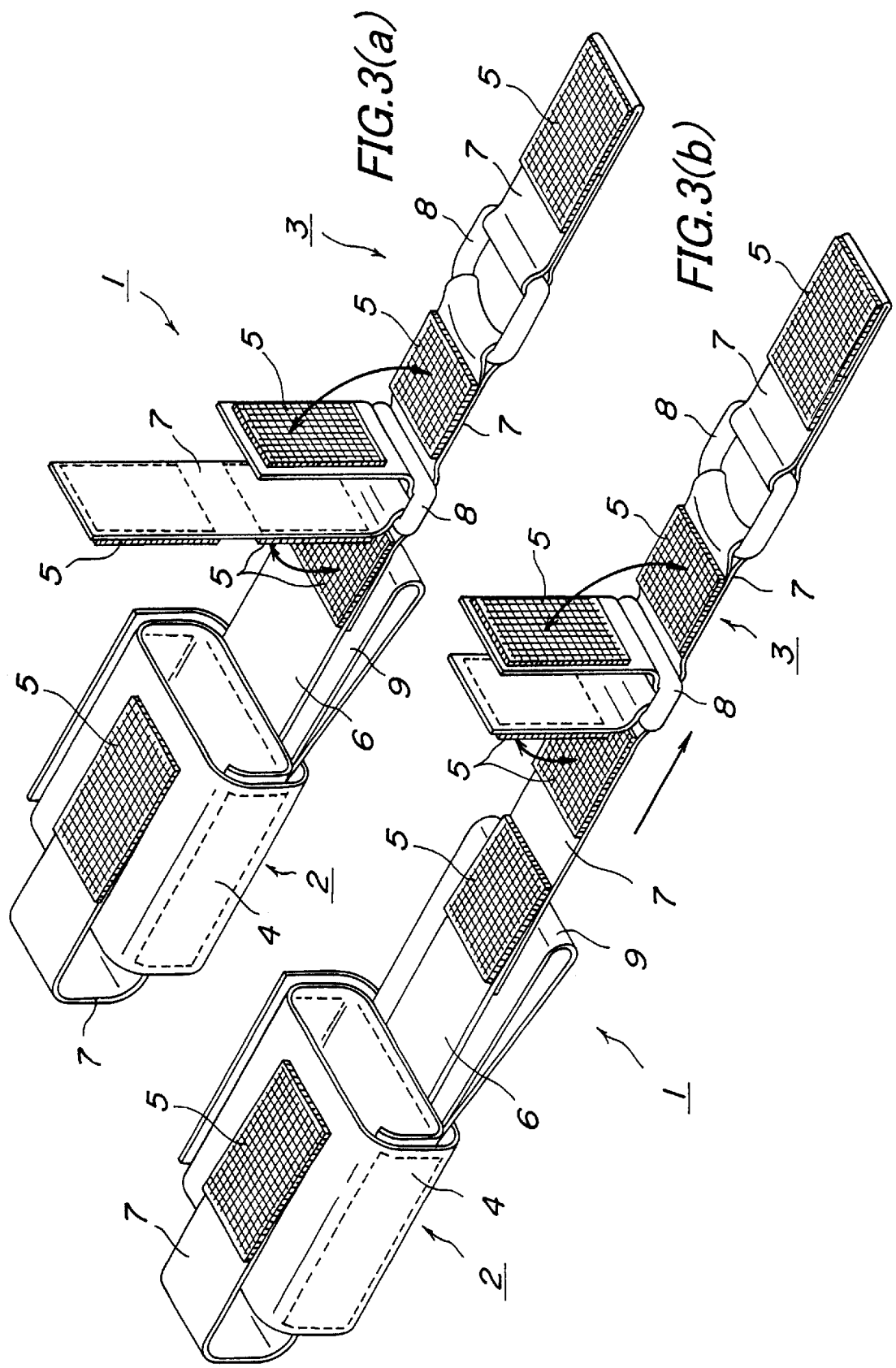

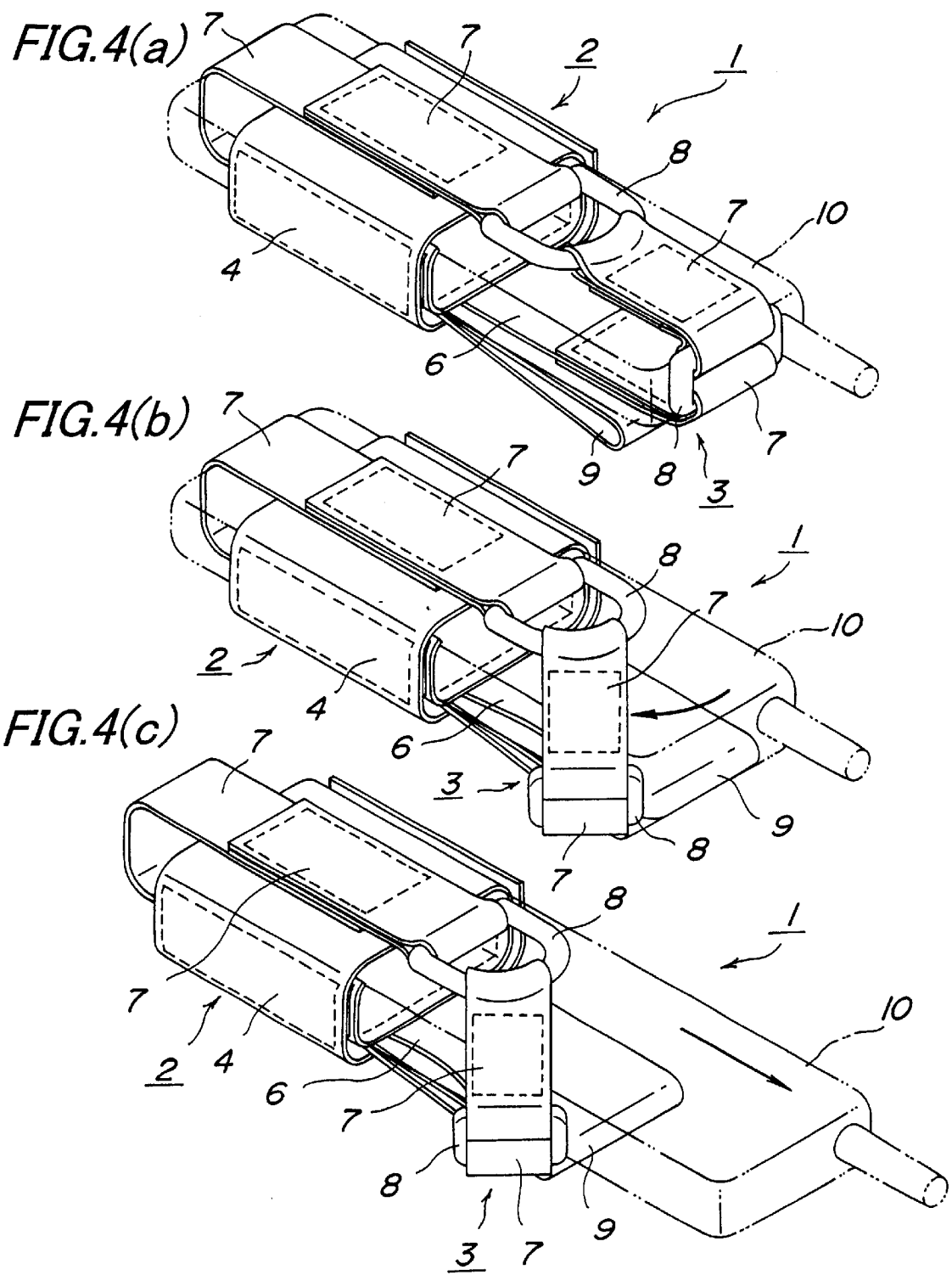

CELLULAR PHONE HOLDER

BACKGROUND OF THE INVENTION

1. Field of the Invention

This invention relates to a holder for a cellular phone or a transceiver capable of holding a standard type cellular phone with a size of substantially 13 cm×4 cm as well as a collapsible type cellular phone with a size of substantially 9 cm×5 cm, respectively (hereinafter simply referred to as "cellular phone holder) and, more particularly, relates to a cellular phone holder having a relatively simple structure in which a lateral case and a longitudinal strap belt are combined.

2. Description of Related Art

Regarding the conventional cellular phone holders for holding thus types of cellular phones, cellular phone holders for the standard type cellular phones and cellular phone holders for the collapsible type cellular phones were manufactured and distributed separately, as shown in, e.g., the Japanese Utility Model Registered No. 3040416 or No. 3044940.

Conventionally, the standard type cellular phones were widely used and took most of the share of cellular phones. However, nowadays the collapsible type cellular phones are also increasingly used, and furthermore, cases where an individual owns both types of cellular phones and uses the respective types for proper occasions are increasing.

Accordingly, in a case where an individual owns both types of cellular phones, the preparation of two types of cellular phone holders having different sizes was costly as well as inconvenient for thus individual. In addition, the conventional cellular phone holder raised a problem of inconvenience in such occasions where thus cellular phone holder is attached to a waist belt or the like, or hung around a neck.

This invention relating to a cellular phone holder is a completely new technology developed to solve the aforementioned problems and, more particularly, this cellular phone holder has a completely new structure comprising a single particular case capable of holding a standard type cellular phone as well as a collapsible type cellular phone, respectively according to necessity.

SUMMARY OF THE INVENTION

The cellular phone holder regarding this invention is a completely new technology which drastically solves the aforementioned problems, and a gist of a first invention relates to a cellular phone holder comprising: a lateral case for holding a trunk portion of a cellular phone; and a longitudinal strap belt attached in a manner so as to intersect with the lateral case in which attachment members capable of clinging to each other are arranged on both ends of the longitudinal strap belt for adjusting a length of the longitudinal strap belt.

The lateral case of the cellular phone holder regarding the first invention is capable of holding a cellular phone of a standard type as well as a cellular phone of a collapsible type in which the phones have a width different from each other.

Since the cellular phone holder of the first invention has a structure in which the attachment members capable of clinging to each other are arranged on both ends of the longitudinal strap belt for adjusting the length of thus longitudinal strap belt, the longitudinal strap belt could longitudinally secure an outer peripheral surface a standard type cellular phone as well as a collapsible type cellular phone having different length.

A gist of a cellular phone holder of a second invention according to the cellular phone holder of the first invention relates to the lateral case formed of a single trunk member adjustable of the inner diameter size of the lateral case by wrapping and securing the trunk member, and thus, the attachment members capable of clinging to each other are arranged in plural portions of the trunk member of the lateral case.

Regarding the second invention, the inner diameter of the lateral case in which the attachment members are arranged in plural portions of the trunk member of the lateral case, is freely adjustable to warp and secure the trunk member, and such wrapping and securing is made possible by fixing the attachment members with each other.

A gist of a cellular phone holder of a third invention according to the cellular phone holder of the first invention and the second invention relates to a portion of the longitudinal strap belt having an elastic structure.

Regarding the third invention, the longitudinal strap belt could be fastened across the longitudinal direction of the cellular phone with a suitable tension owing to the elastic portion of the longitudinal strap belt; accordingly, thus fastened longitudinal strap belt could easily be unfastened to a side of the cellular phone and could easily be re-fastened as well. Therefore, a cellular phone could easily be taken out of the lateral case and could easily be held inside the lateral case as well.

A gist of a cellular phone holder of a fourth invention according to the cellular phone holder of the first invention through the third invention relates to a ring which couples the longitudinal strap belt to a plurality of strap belts.

Regarding the fourth invention, the ring enables the strap belts coupled with each other to smoothly slide sideways along thus ring because of the structure in which the ring couples the longitudinal strap belt to the plurality of strap belts. Accordingly, the longitudinal strap fastened to a cellular phone could be more easily unfastened toward a side of a cellular phone.

A gist of a cellular phone holder of a fifth invention according to the cellular phone holder of the first invention through the fourth invention relates to a structure in which the lateral case and the longitudinal strap belt are formed by an electromagnetic wave shielding member, respectively.

Regarding the fifth invention, the physically hazardous effect of electromagnetic wave emitted from the cellular phone held inside the cellular phone holder could be prevented since the lateral case and the longitudinal strap belt are respectively formed by an electromagnetic wave shielding member.

A gist of a cellular phone holder of a sixth invention according to the cellular phone holder of the first invention through the fifth invention relates to a band for attachment on a trouser belt or the like arranged on a back side of the lateral case in which the band could adjust length by altering an arrangement of an attachment member disposed on a tip of thus band.

Regarding the sixth invention, the band could be attached through the trouser belt without having to remove the trouser belt since the band is arranged on a back side of the lateral case in which the band for attachment on a trouser belt or the like is capable of adjusting length and has an attachment member disposed on the tip of thus band. In addition, by altering the position of the attachment member so as to make the length of the band longer, a space would be created between the band and the waist belt; accordingly, the cellular phone longitudinally positioned upon the waist belt would become tilted and would not be an obstruction when a user takes a seat. Furthermore, the band could be shortened so that the cellular phone holder could be secured to a predetermined position when attached to a shoulder of a rucksack or the like.

BRIEF DESCRIPTION OF THE DRAWINGS

The above and other objects and features of the invention are apparent to those skilled in the art from the following preferred embodiments thereof when considered in conjunction with the accompanied drawings, in which:

FIGS. 3(a) and (b) are descriptive perspective views showing a structure of other examples, respectively;

FIGS. 4(a), (b), and (c) are perspective views showing a state where a cellular phone is taken out by removing a longitudinal strap belt sideways, respectively.

DESCRIPTION OF THE PREFERRED EMBODIMENTS

Figure 1:
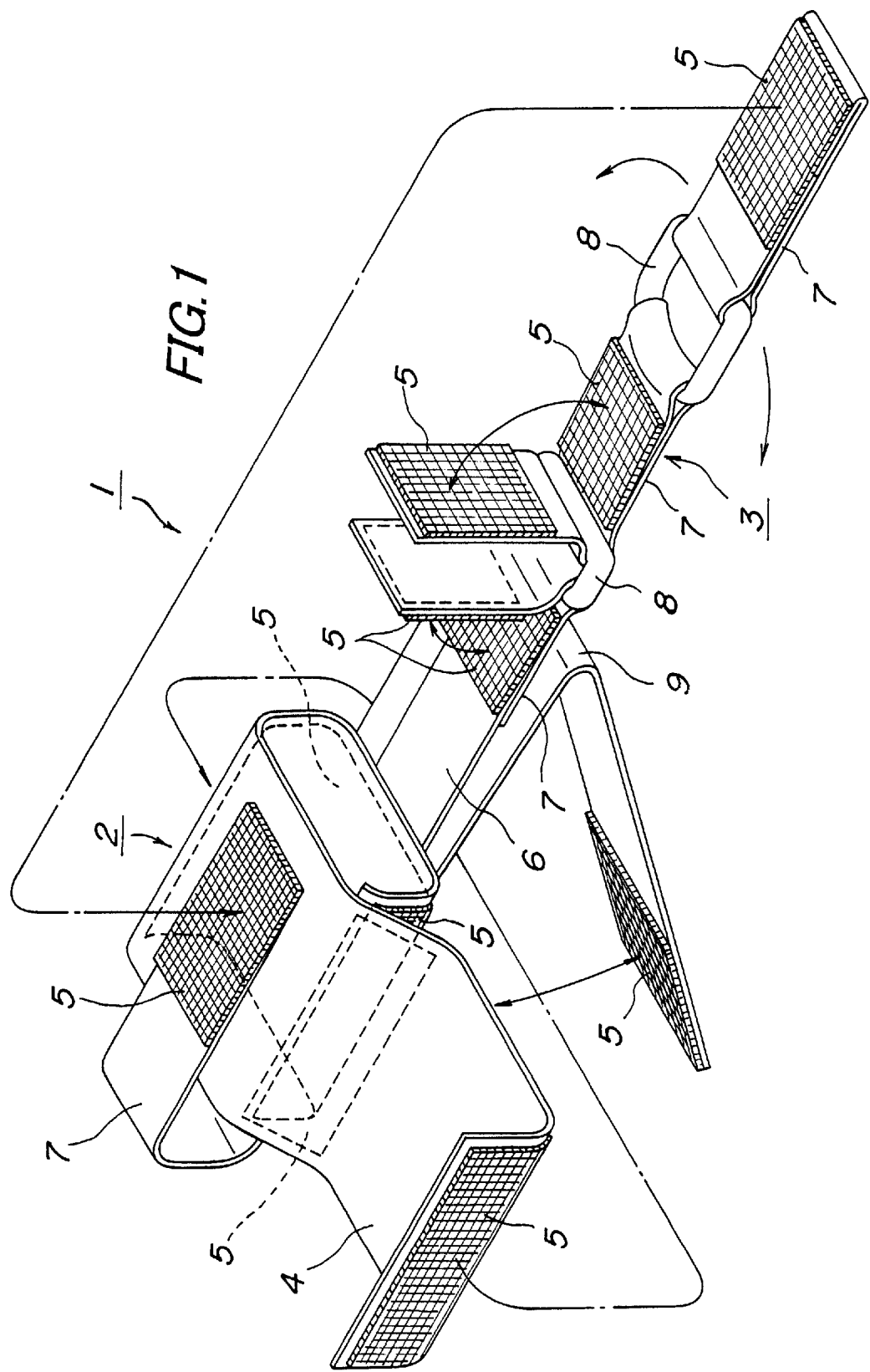
FIG. 1 is a developed perspective view showing a structure of a cellular phone holder regarding this invention.
Figure 2:
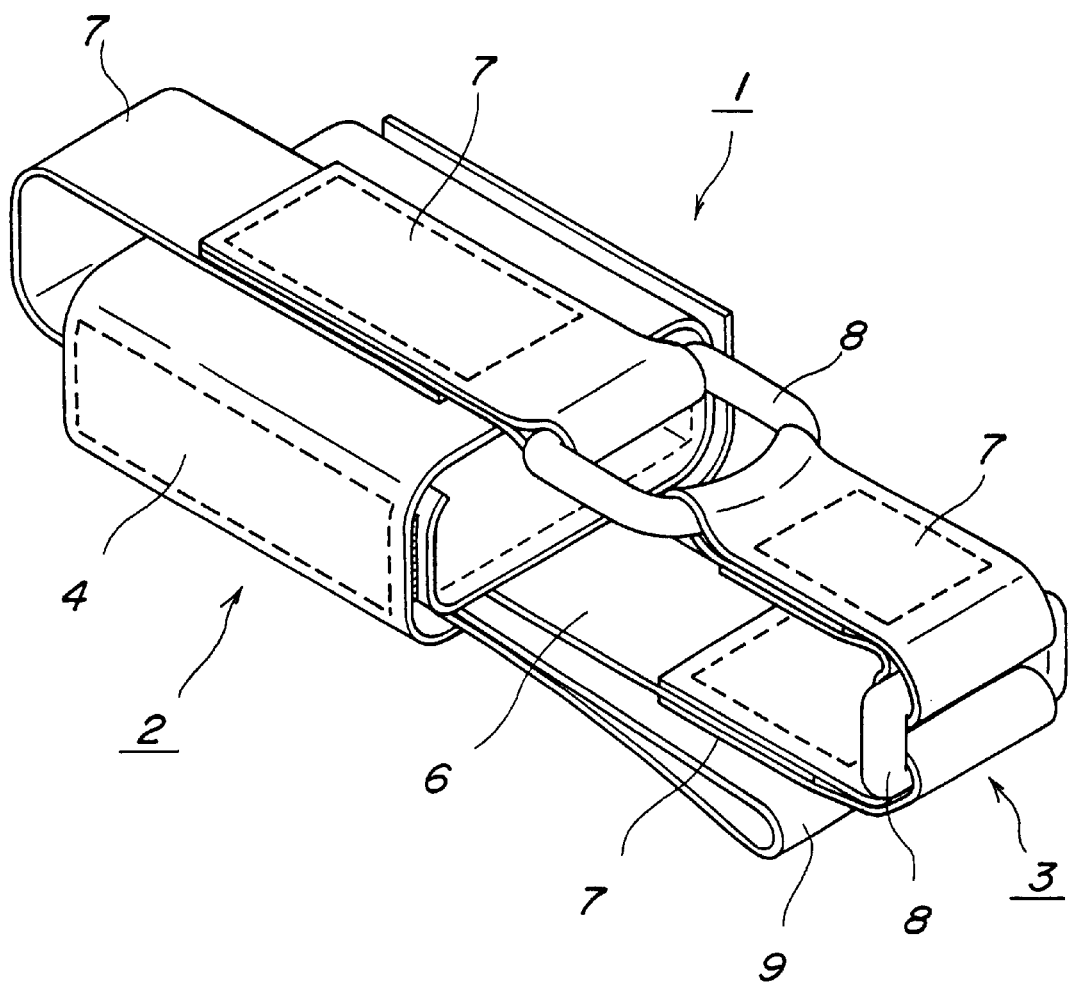
FIG. 2 shows a fully assembled state of the cellular phone holder of FIG. 1.

An embodiment of the cellular phone holder regarding this invention will hereinafter be specifically described with reference to the following drawings in which: FIG. 1 is a developed perspective view showing a structure of a cellular phone holder regarding this invention; FIG. 2 shows a fully assembled state of the cellular phone holder of FIG. 1; FIGS. 3(a) and (b) are descriptive perspective views showing a structure of other examples, respectively; FIGS. 4(a), (b), and (c) are perspective views showing a state where a cellular phone is taken out by removing a longitudinal strap belt sideways, respectively; and FIGS. 5(a) and (b) are referential views showing an example of an attached state of a standard type cellular phone and a collapsible type cellular phone.

FIG. 1 and FIG. 2 show a cellular phone holder 1 regarding this invention comprised of a lateral case 2 and a longitudinal strap belt 3 attached in a manner so as to intersect with the lateral case 2.

The lateral case 2 is structured with a single wide strap-like trunk member 4 in which the trunk member is made from such as a fabric of chemical fiber, cotton or the like; a resin; or leather. A Velcro (Registered Trademark, also Registered Trademark "Magic Tape" in Japan) tape 5 capable of clinging to each other is arranged in a predetermined position of the trunk member 4.

The lateral case 2 for holding a trunk portion of a cellular phone is easily structured by bending and wrapping the trunk member 4 into a cylindrical shape and thus having a plurality of Velcro tapes 5 arranged at predetermined positions to cling with each other.

Thus structure of the lateral case 2 enables free adjustment of an inner diameter of the lateral case 2 by altering the clinging positions of the Velcro tapes 5 arranged on the trunk member 4.

The Velcro tapes 5 capable of clinging to each other are also arranged at predetermined positions on both ends of the longitudinal strap belt 3. The longitudinal strap belt 3 has an elastic structure since a portion of the longitudinal strap belt 3 is formed by an elastic material 6 e.g., a rubber material.

Other than the elastic material 6, the longitudinal strap belt 3 is comprised of a plurality of strap belts 7 in the plural strap belts 7 are coupled to each other by a ring 8. As shown particularly in FIG. 1, a length of a portion of the strap belt 7 could be adjusted by altering the bending and clinging position of the Velcro tape 5.

A band 9 is detachably attached to a back portion of the lateral case 2 and the longitudinal strap belt 3 by using the Velcro tape 5 arranged at the tip of the band 9. The length of the band 9 could be adjusted by altering the attachment position and by attaching the band 9 through a waist belt 11, the cellular phone holder 1 could be longitudinally attached to a waist area. In addition, by attaching the band 9 through a hanging member, not shown, the cellular phone holder 1 could be used by hanging around the neck or the like.

Since the length of the band 9 could be adjusted by altering the attachment position of the Velcro tape arranged on the tip of thus band 9, by making the length of the band 9 longer, a space would be created between the band and the waist belt 11; accordingly, the cellular phone longitudinally positioned upon the waist belt 11 would become tilted and would not be an obstruction when a user takes a seat. Furthermore, the band could be shortened so that the cellular phone holder 1 could be secured to a predetermined position when attached to a shoulder of a rucksack or the like.

Since the cellular phone holder 1 shown in FIG. 1 and FIG. 2 could adjust the inner diameter of the lateral case 2 by altering the position of the wrapping and clinging position of the trunk member 4, a standard type cellular phone as well as a collapsible type cellular phone having different width could be securely held within the lateral case 2 respectively.

Furthermore, since the cellular phone holder 1 is capable of altering the length of the longitudinal strap belt 3, both types of cellular phones having different longitudinal length (height) could be fastened securely by adjusting the longitudinal strap belt 3.

As the examples shown in FIGS. 3(a) and (b), the length of the longitudinal strap belt 3 would become more adjustable by attaching a long Velcro tape 5 to a portion of a strap belt 7 of a longitudinal strap belt 3, or by attaching a plurality of a Velcro tape 5 in an intervallic-spaced arrangement.

The longitudinal strap belt 3 could freely be stretched owing to the elastic material 6 provided at a portion of the longitudinal strap belt 3 in accordance with the embodiment of the cellular phone holder 1.

As shown in FIGS. 4(a), (b), (c), the cellular phone 10 could easily be taken out of the cellular phone holder 1 by sliding the tip of the longitudinal strap belt 3 fastened to a cellular phone 10 across the top of the cellular phone 10 and then by removing the longitudinal strap belt 3 from the cellular phone 10. On the other hand, the cellular phone 10 could be held inside the cellular phone holder 1 by re-fastening the longitudinal strap belt 3 to the cellular phone 10.

Furthermore, the strap belt 7 could smoothly be moved sideways along the ring 8 owing to the structure in which a ring couples a longitudinal strap belt 3 coupled to a plurality of strap belt 7; accordingly, the longitudinal strap belt 3 could be more easily unfastened from and more easily fastened to the cellular phone 10.

Although the Velcro tape 5 is used to temporarily secure the trunk member 4, the strap belt 7, the band 9 etc. in this embodiment, the use would not be limited to Velcro tape 5 and other attachment members could be used instead as long as thus members are detachable.

The lateral case 2 and the longitudinal strap belt 3 comprised in the cellular phone holder 1 could be formed with an electromagnetic wave shielding member, respectively. Thus using the electromagnetic wave shielding member, a physically hazardous effect of electromagnetic wave emitted from the cellular phone held inside the cellular phone holder 1 could be prevented.

Although the cellular phone holder 1 of this embodiment is structured for holding a standard type cellular phone as well as a collapsible type cellular phone in which the length of the longitudinal strap belt 3 could be extensively adjusted by use of the strap belt 7 and the ring 8, in an occasion where the cellular phone holder 1 is used for holding only a single type of cellular phone, the longitudinal strap belt 3 could be structured with just an elastic material 6 e.g., a rubber material formed among a portion of thus longitudinal strap belt 3.

Figure 5B:
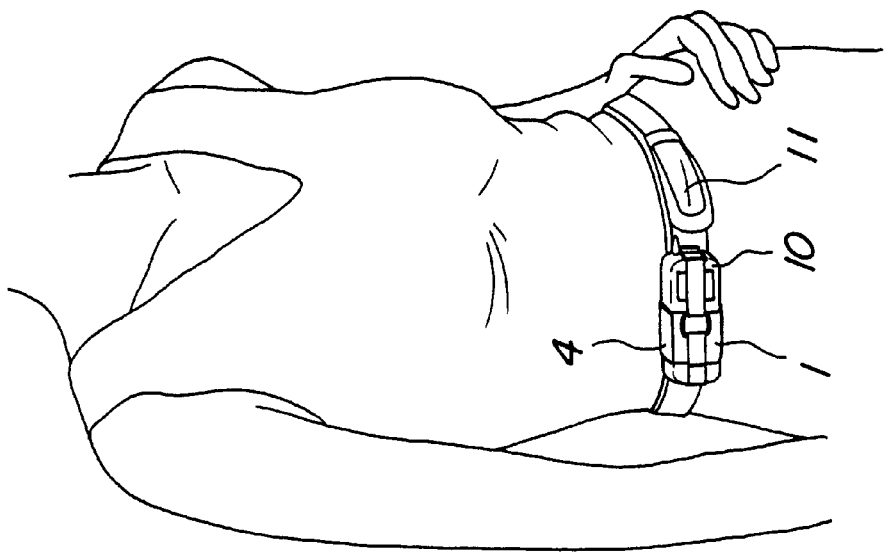
FIGS. 5(a) and (b) are referential views showing an example of an attached state of a standard type cellular phone and a collapsible type cellular phone.
Figure 5A:
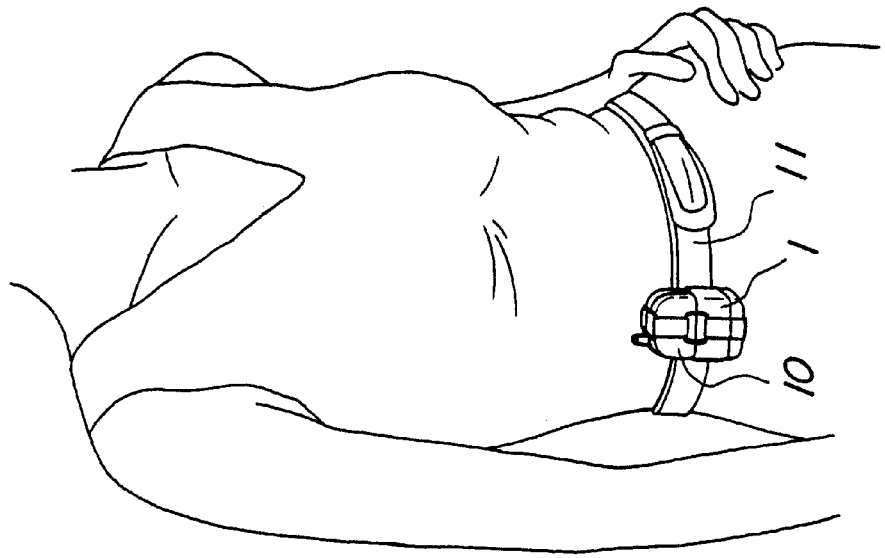

As the examples shown in FIGS. 5(a) and (b), when attaching a cellular phone holder 1 holding a cellular phone 10 to a waist, the cellular phone holder 1 could easily be attached to a waist area by attaching the trunk member 4 or the band 9 of the cellular phone holder 1 through a waist belt 11. FIG. 5(a) shows the embodiment of the attached state of the standard type cellular phone and FIG. 5(b) shows the embodiment of the attached state of the collapsible type cellular phone.

The lateral case of the cellular phone holder could hold within a standard type cellular phone as well as a collapsible type having different width, since this invention regarding the cellular phone holder is structured to freely change the inner diameter of thus lateral case 2, which holds the trunk portion of the cellular phone. Furthermore, the longitudinal strap belt could longitudinally secure the outer peripheral surface of the standard type cellular phone as well as the collapsible type cellular phone having different longitudinal length, since the longitudinal strap belt capable of adjusting length is attached and fixed to the back of the lateral case in a manner so as to intersect with the lateral case.

By arranging Velcro tape at plural portions of the trunk member of the lateral case, the Velcro tape would cling to each other at prescribed portions and would make the altering and adjustment of the inner diameter of the lateral case more easier.

Since a portion of the longitudinal strap belt is made into an elastic structure, the longitudinal strap belt could be easily removed or re-fastened by sliding sideways thus longitudinal strap belt fastened across the cellular phone.

Since a ring couples the longitudinal strap belt to a plurality of strap belts, the longitudinal strap belt fastened across the cellular phone could be removed or re-fastened more easily by sliding the respective strap belts sideways along thus ring.

Since the lateral case and the longitudinal strap belt of the cellular phone holder regarding this invention is formed by an electromagnetic wave-shielding member, the physically hazardous electromagnetic wave emitted from the cellular phone held inside the cellular phone holder could be prevented.

A band could be attached through the trouser belt without having to remove the trouser belt since the band is arranged on a back side of the lateral case in which the band for attachment on a trouser belt or the like is capable of altering length and has an attachment member disposed on the tip of thus band. By altering the position of the attachment member so as to make the length of the band longer, a space would be created between the band and the waist belt; accordingly, the cellular phone longitudinally positioned upon the waist belt would become tilted and would not be an obstruction when taking a seat. Furthermore, the band could be shortened so that the cellular phone holder could be fixed to a predetermined position during an attachment to a shoulder of a rucksack or the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but should be defined by claims set forth below.

What is claimed is:

1. A cellular phone holder comprising:
   a lateral case having an adjustable circumference for laterally removably encompassing a trunk portion of a cellular phone around a lateral circumference of said cellular phone; and
   a longitudinal strap belt having a first and second end attached to said lateral case in a perpendicular direction thereto so as to intersect with the lateral case for securing the cellular phone within said lateral case, said longitudinal strap belt comprising a plurality of attachment members removably attached to one another arranged on each end of the longitudinal strap belt for adjusting a length of the longitudinal strap belt.

2. The cellular phone holder according to claim 1, wherein one or more of the attachment members of the longitudinal strap belt are formed of an elastic material.

3. The cellular phone holder according to claim 2, wherein the longitudinal strap belt is coupled to one or more additional strap belts by a ring.

4. The cellular phone holder according to claim 2, wherein the lateral case and the longitudinal strap belt are formed of an electromagnetic wave shielding material.

5. The cellular phone holder according to claim 2, wherein the lateral case has a band for attachment on a trouser belt or the like arranged on a back side of the lateral case, and thus a length of the band could be adjusted by altering an arrangement of an attachment member disposed on the tip of the band.

6. The cellular phone holder according to claim 1, wherein the longitudinal strap belt is coupled to one or more additional strap belts by a ring.

7. The cellular phone holder according to claim 6, wherein the lateral case and the longitudinal strap belt are formed of an electromagnetic wave shielding material.

8. The cellular phone holder according to claim 6, wherein the lateral case has a band for attachment on a trouser belt or the like arranged on a back side of the lateral case, and thus a length of the band could be adjusted by altering an arrangement of an attachment member disposed on the tip of the band.

9. The cellular phone holder according to claim 1, wherein the lateral case and the longitudinal strap belt are formed of an electromagnetic wave shielding material.

10. The cellular phone holder according to claim 9, wherein the lateral case has a band for attachment on a trouser belt or the like arranged on a back side of the lateral case, and thus a length of the band could be adjusted by altering an arrangement of an attachment member disposed on the tip of the band.

11. The cellular phone holder according to claim 1, wherein the lateral case has a band having a tip and an attachment member for attachment on a trouser belt or the like arranged on a back side of the lateral case, a length of the band being adjustable by altering an arrangement of the attachment member disposed on the tip of the band.

* * * * *